US010505657B2

(12) United States Patent
Ou et al.

(10) Patent No.: US 10,505,657 B2
(45) Date of Patent: Dec. 10, 2019

(54) TERMINAL STATION DEVICE AND BANDWIDTH ALLOCATION METHOD

(71) Applicant: NIPPON TELEGRAPH AND TELEPHONE CORPORATION, Tokyo (JP)

(72) Inventors: Hiroshi Ou, Yokosuka (JP); Tatsuya Shimada, Yokosuka (JP); Takayuki Kobayashi, Yokosuka (JP); Jun Terada, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 154 days.

(21) Appl. No.: 15/558,395

(22) PCT Filed: Mar. 25, 2016

(86) PCT No.: PCT/JP2016/059660
§ 371 (c)(1),
(2) Date: Sep. 14, 2017

(87) PCT Pub. No.: WO2016/158767
PCT Pub. Date: Oct. 6, 2016

(65) Prior Publication Data
US 2018/0063831 A1 Mar. 1, 2018

(30) Foreign Application Priority Data
Mar. 30, 2015 (JP) .................. 2015-070263

(51) Int. Cl.
H04J 14/02 (2006.01)
H04L 12/44 (2006.01)
(Continued)

(52) U.S. Cl.
CPC ...... *H04J 14/0227* (2013.01); *H04J 14/0228* (2013.01); *H04J 14/0252* (2013.01);
(Continued)

(58) Field of Classification Search
CPC ... H04L 12/44; H04L 47/824; H04L 12/2861; H04W 28/20; H04B 10/27; H04B 10/25752; H04J 14/0228; H04J 14/0252
See application file for complete search history.

(56) References Cited

U.S. PATENT DOCUMENTS

2009/0202249 A1  8/2009  Ogushi
2011/0085799 A1  4/2011  Mizutani
(Continued)

FOREIGN PATENT DOCUMENTS

JP  2011-087023 A  4/2011
JP  2014-165634 A  9/2014
(Continued)

OTHER PUBLICATIONS

"IEEE Std. 802.3-2012", IEEE, 2012.
(Continued)

*Primary Examiner* — Omer S Mian
(74) *Attorney, Agent, or Firm* — Harness, Dickey & Pierce, P.L.C.

(57) ABSTRACT

Information on allocation of a bandwidth of uplink communication of each user device is extracted from information notified by an upper-level device on the uplink communication of the user devices. Identification information of a lower-level device connected to a terminal device and identification information of the user devices are stored in correlation with each other. A bandwidth demanded for uplink communication of the terminal device is determined on the basis of the information on the allocation of the bandwidth of the uplink communication of each of the user (Continued)

devices and the identification information of the user devices. A start time point of the uplink communication of the terminal device and the amount of information of signals for which transmission of the uplink communication of the terminal device is allowed are allocated to the terminal device on the basis of the bandwidth demanded for the uplink communication of the terminal device.

6 Claims, 11 Drawing Sheets

(51) Int. Cl.
H04W 28/20 (2009.01)
H04W 72/04 (2009.01)
H04W 72/12 (2009.01)
H04L 12/913 (2013.01)
H04L 12/911 (2013.01)
H04W 88/02 (2009.01)

(52) U.S. Cl.
CPC ............ *H04L 12/44* (2013.01); *H04L 47/724* (2013.01); *H04L 47/824* (2013.01); *H04W 28/20* (2013.01); *H04W 72/0413* (2013.01); *H04W 72/12* (2013.01); *H04W 88/02* (2013.01)

(56) References Cited

U.S. PATENT DOCUMENTS

2015/0229397 A1 8/2015 Shibata et al.
2015/0311980 A1* 10/2015 Kuwano ............. H04L 12/2861
398/58
2016/0277142 A1* 9/2016 Doo ........................ H04J 14/08

FOREIGN PATENT DOCUMENTS

WO WO-2014/061552 A1 4/2014
WO WO-2014-077168 A1 5/2014
WO WO-2014077168 A1 * 5/2014 ......... H04L 12/2861

OTHER PUBLICATIONS

International Search Report (in English and Japanese) issued in PCT/JP2016/059660, dated May 31, 2016; ISA/JP.
Gangxiang Shen et al: "Fixed Mobile Convergence Architectures for Broadband Access: Integration of EPON and WiMAX [Topics in Optical Communications]", IEEE Communications Magazine, IEEE Service Center, Piscataway, US, vol. 45, No. 8, Aug. 1, 2007 (Aug. 1, 2007), pp. 44-50, XP011190288, ISSN: 0163-6804.
Extended European Search Report for related application EP 16772648.8, EPO, Munich, dated Oct. 9, 2018.

* cited by examiner

| USER DEVICE IDENTIFIER u | LOWER-LEVEL DEVICE IDENTIFIER i | PRIORITY LEVEL L | ALLOWABLE LOWER-LEVEL NETWORK TRANSMISSION AMOUNT W[u] |
|---|---|---|---|
| u1 | i1 | L1 | W[u1] |
| ⋮ | ⋮ | ⋮ | ⋮ |

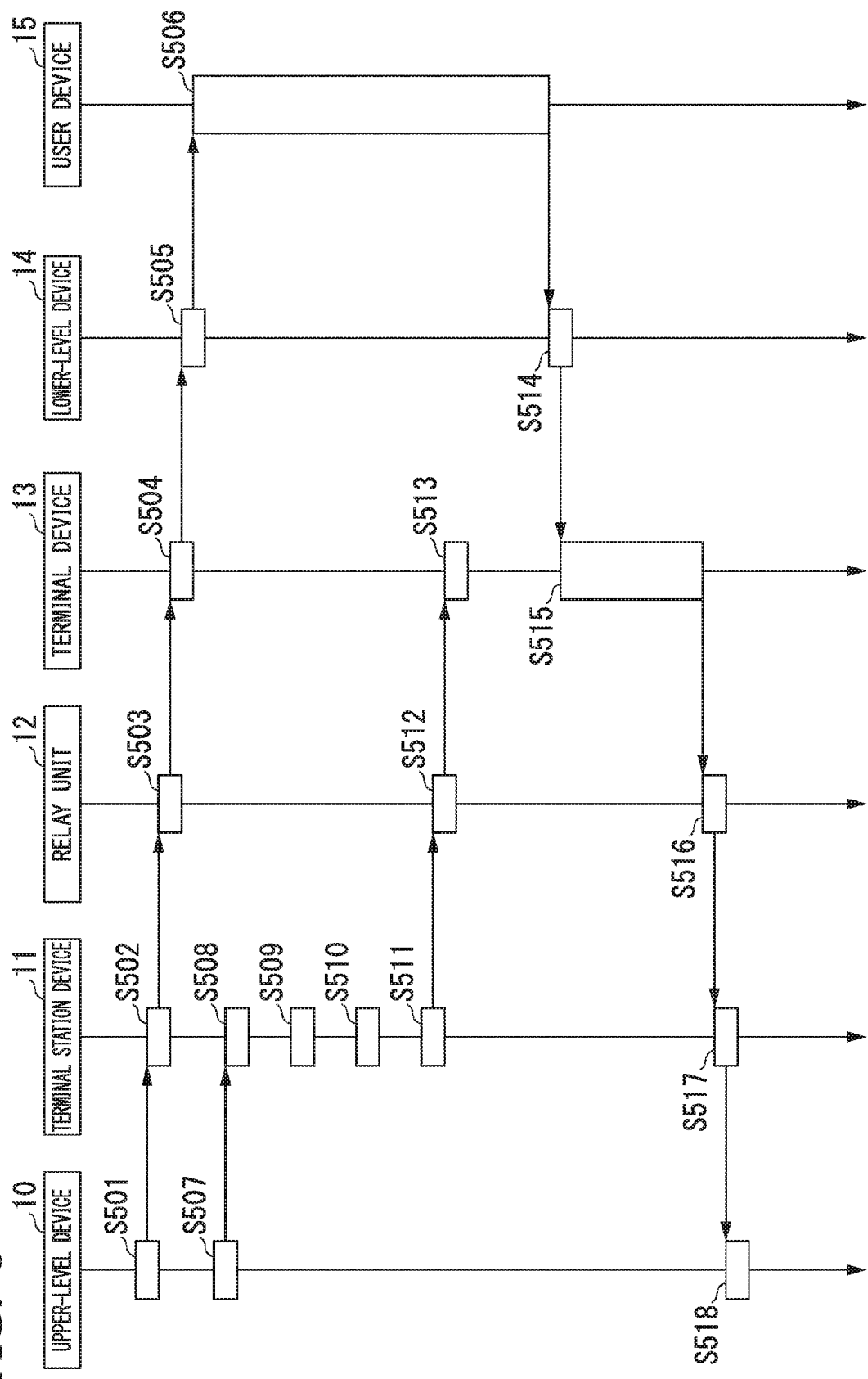

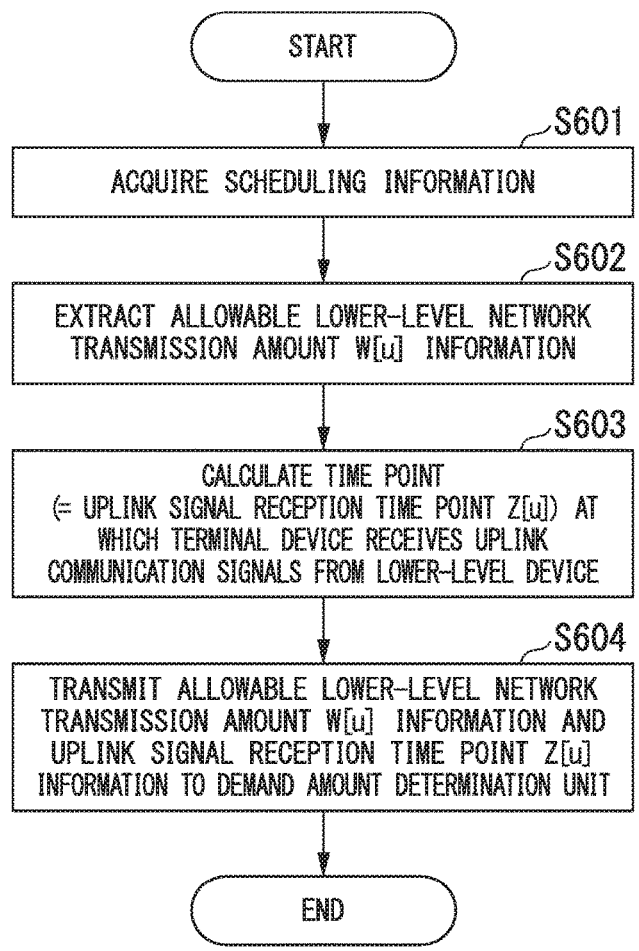

TERMINAL STATION DEVICE AND BANDWIDTH ALLOCATION METHOD

CROSS REFERENCE TO RELATED APPLICATIONS

This application is a U.S. National Phase Application under 35 U.S.C. 371 of International Application No. PCT/JP2016/059660 filed on Mar. 25, 2016 and published in Japanese as WO 2016/158767 on Oct. 6, 2016. This application is based on and claims the benefit of priority from Japanese Patent Application No. 2015-070263 filed on Mar. 30, 2015. The entire disclosures of all of the above applications are incorporated herein by reference.

TECHNICAL FIELD

The present invention relates to a terminal station device and a bandwidth allocation method.
Priority is claimed on Japanese Patent Application No. 2015-070263, filed Mar. 30, 2015, the content of which is incorporated herein by reference.

BACKGROUND ART

In a mobile radio communication service such as Long Term Evolution (LTE), LTE-Advanced, and the like (hereinafter collectively referred to as "LTE and the like"), a radio base station device may sometimes include a base band unit (BBU) and a remote radio head (RRH).

A base band unit of a radio base station device may sometimes include an upper-level device and a terminal station device. The upper-level device and the terminal station device may sometimes be integrated in a base station and execute a baseband process.

On the other hand, a remote radio head of a radio base station device is not integrated in a base station and executes a radio process outside the base station. Moreover, the remote radio head is positioned in a lower-level device in relation to an upper-level device and a terminal station device.

Moreover, in a general configuration, a terminal device is connected to a terminal station device in one-to-one correspondence.

In contrast, in Patent Document 1, a remote radio head, which is a lower-level device, is connected to a terminal station device via a terminal device of a communication system in which a terminal station device is connected to a plurality of terminal devices in one-to-multiple correspondence (see Patent Document 1).

Moreover, LTE and the like use finite frequency resources efficiently by arranging a large number of small cells in an area to achieve a faster data rate and a larger communication capacity. LTE and the like discuss methods of accommodating an upper-level device, a terminal station device, a terminal device, and a lower-level device using a communication system in which a terminal station device and a plurality of terminal devices are connected in one-to-multiple correspondence. A passive optical network (PON) system is an example of a communication system in which a terminal station device and a plurality of terminal devices are connected in one-to-multiple correspondence (see Non-Patent Document 1).

In a mobile radio communication service, strict requirements are set for latency between an upper-level device and a lower-level device for execution of re-transmission control (a hybrid automatic repeat request (HARQ)). Therefore, in Patent Document 1, uplink communication scheduling information of a user device connected to a lower-level device is sequentially transmitted from an upper-level device to a terminal station device, a terminal device, and the lower-level device and the user device is notified thereof. Moreover, a start time and the amount of signal information of uplink communication from the terminal device to the terminal station device are calculated on the basis of the uplink communication scheduling information. In this way, signals of the uplink communication from the lower-level device to the upper-level device according to Patent Document 1 are transmitted with low latency.

CITATION LIST

Patent Literature

[Patent Document 1]
International Patent Publication WO2014/077168

Non-Patent Literature

[Non-Patent Document 1]
"IEEE Std. 802.3-2012", IEEE, 2012

SUMMARY OF INVENTION

Technical Problem

In a mobile radio communication service, a lower-level device and user devices may sometimes be connected in one-to-multiple correspondence. In this case, the amount of signal information of the uplink communication of the terminal device according to Patent Document 1 is calculated on the basis of uplink communication scheduling information of a plurality of connected user devices. Moreover, in order to further decrease latency of a transmission of uplink communication signals, the terminal station device needs to consider a timing at which the terminal device receives uplink communication signals transmitted from the user device via the lower-level device.

However, in a conventional terminal station device, there is a problem in that it is difficult to improve utilization efficiency of a frequency band of a communication system in which a lower-level device and user devices are connected in one-to-multiple correspondence.

With the foregoing in view, an object of the present invention is to provide a terminal station device and a bandwidth allocation method capable of improving the utilization efficiency of the bandwidth of a communication system in which a lower-level device and user devices are connected in one-to-multiple correspondence.

Solution to Problem

An aspect of the present invention provides a terminal station device in which a terminal device connected to a lower-level device accommodating a plurality of user devices is connected on a lower level side and an upper-level device is connected on an upper-level side, the terminal station device including: an information extraction unit that extracts information on allocation of a bandwidth of uplink communication of each of the plurality of user devices from information notified by the upper-level device on the uplink communication of the plurality of user devices; a storage unit that stores identification information of the lower-level device connected to the terminal device and identification information of the plurality of user devices in correlation with each other; a demand amount determination unit that determines a bandwidth demanded for the uplink communication of the terminal device on a basis of the information on the allocation of the bandwidth of the uplink communication of each of the plurality of user devices, the identification information of the lower-level device and the identification information of the plurality of user devices; and a bandwidth allocation unit that allocates a start time point of the uplink communication of the terminal device and an amount of information of signals for which transmission of the uplink communication of the terminal device is allowed to the terminal device on a basis of the bandwidth demanded amount for the uplink communication of the terminal device.

As a typical example, the terminal station device further includes a communication unit that receives the identification information of the lower-level device connected on a lower level of the terminal device from the terminal device, wherein the information extraction unit extracts information indicating a correspondence between the upper-level device and the lower-level device from the information notified by the upper-level device on the uplink communication of the plurality of user device, and the storage unit stores the identification information of the lower-level device connected to the terminal device, the information indicating the correlation between the upper-level device and the lower-level device, and the identification information of the plurality of user devices in correlation with each other.

As a preferred example, the information extraction unit extracts information on an amount of information of signals for which transmission of the uplink communication of the plurality of user devices is allowed from the information on the uplink communication of the plurality of user devices and calculates a time point at which the terminal device receives uplink communication signals from the plurality of user device on a basis of a time point at which the information extraction unit receives the information on the uplink communication from the upper-level device and a period required for signals to be transmitted between the terminal station device and the terminal device, and the demand amount determination unit determines the bandwidth demanded amount for the uplink communication of the terminal device on a basis of the amount of information of the signals for which transmission of the uplink communication of the plurality of user devices is allowed and the time point at which the terminal device receives the uplink communication signals from the plurality of user devices.

The demand amount determination unit may calculate a sum of amounts of information of signals for which transmission of the uplink communication of the plurality of user devices is allowed for each terminal device correlated with the plurality of user devices and set the sum as the bandwidth demanded amount for the uplink communication of the terminal device.

Moreover, the demand amount determination unit may calculate a sum of amounts of information of signals for which transmission of the uplink communication of the plurality of user devices is allowed for each terminal device correlated with a user device to which the terminal device transmits uplink communication signals received in a specific time period and set the sum as the bandwidth demanded amount for the uplink communication of the terminal device.

Furthermore, the bandwidth allocation unit may subdivide the bandwidth demanded amount for the uplink communication of the terminal device and allocate a start time point of the uplink communication of the terminal device and the amount of information of signals for which transmission of the uplink communication of the terminal device is allowed to the terminal device repeatedly for a plurality of times.

Another aspect of the present invention provides a bandwidth allocation method in a terminal station device in which a terminal device connected to a lower-level device accommodating a plurality of user devices connected on a lower level side and an upper-level device is connected on an upper-level side, the bandwidth allocation method including: extracting information on allocation of a bandwidth of uplink communication of each of the plurality of user devices from information notified by the upper-level device on the uplink communication of the plurality of user devices, determining a bandwidth demanded amount for uplink communication of the terminal device on a basis of the information on the allocation of the bandwidth of the uplink communication of each of the plurality of user devices, identification information of the lower-level device connected to the terminal device, and identification information of the plurality of user devices, the identification information of the lower-level device and the identification information of the plurality of user devices being stored in correlation with each other; and allocating a start time point of the uplink communication of the terminal device and an amount of information of signals for which transmission of the uplink communication of the terminal device is allowed to the terminal device on a basis of the bandwidth demanded amount for the uplink communication of the terminal device.

Advantageous Effects of Invention

According to the terminal station device and the bandwidth allocation method of the present invention, it is possible to improve the utilization efficiency of the bandwidth of a communication system in which a lower-level device and user devices are connected in one-to-multiple correspondence.

BRIEF DESCRIPTION OF DRAWINGS

FIG. 8 is a sequence diagram showing an example of a procedure of an operation of the communication system according to the first embodiment.

FIG. 9 is a flowchart showing a procedure of an operation of an information extraction unit according to a second embodiment of the present invention.

FIG. 10 is a diagram showing an example of a storage table according to the second embodiment.

DESCRIPTION OF EMBODIMENTS

Embodiments of the present invention will be described in detail with reference to the drawings.

[First Embodiment]

Figure 1:
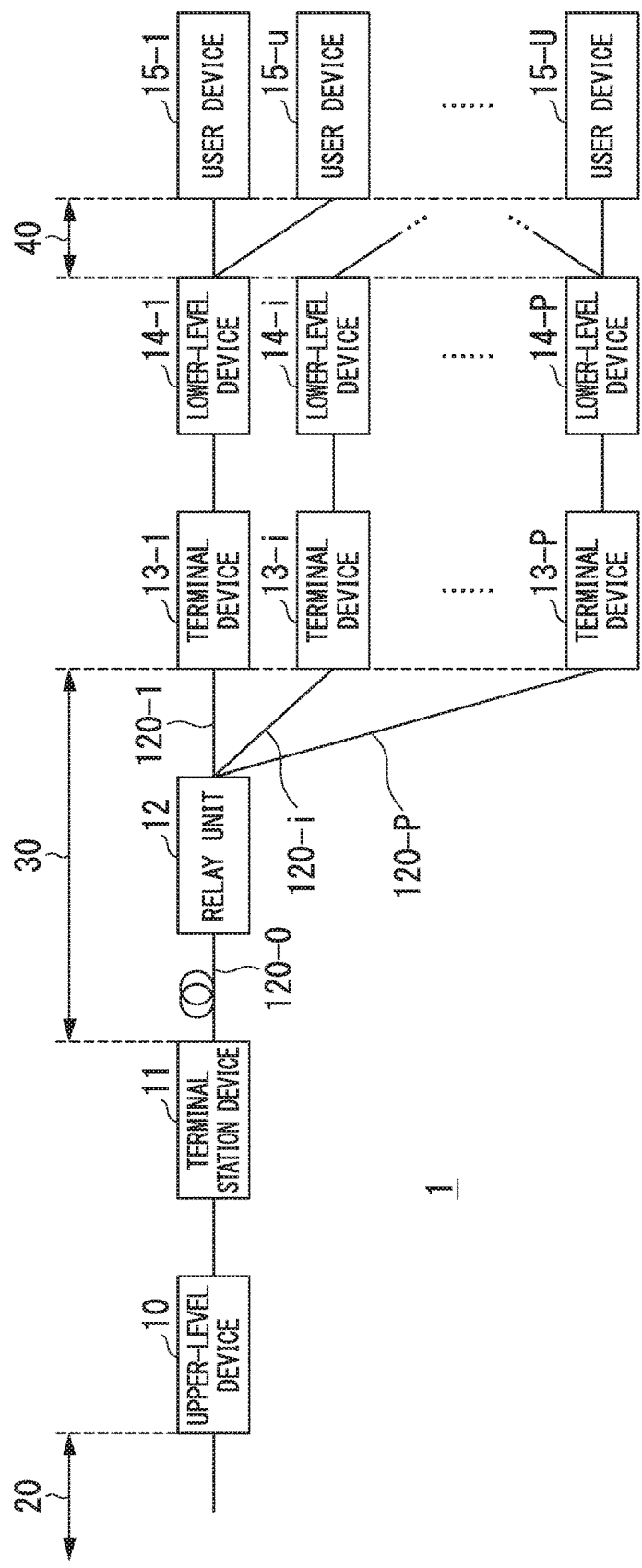
FIG. 1 is a diagram showing a configuration example of a communication system according to a first embodiment of the present invention.

FIG. 1 is a diagram showing a configuration example of a communication system 1 according to a first embodiment of the present invention.

The communication system 1 performs communication using optical signals. The communication system 1 includes an upper-level device 10, a terminal station device 11, a relay unit 12, a terminal device 13 (in the drawings, 13-1 to 13-P), a lower-level device 14 (in the drawings, 14-1 to 14-P), and a user device 15 (in the drawings, 15-1 to 15-U).

As an example, the communication system 1 includes a passive optical network (PON) that includes the terminal station device 11, the terminal device 13, an optical fiber 120 (in the drawing, 120-0 to 120-P), and the relay unit 12.

Hereinafter, a direction from the upper-level device 10 to the user device 15 will be referred to as "downlink". Moreover, a direction from the user device 15 to the upper-level device 10 will be referred to as "uplink".

The upper-level device 10 functions as a base band unit (BBU). The upper-level device 10 may be communicably connected to another upper-level system via an upper-level network 20.

In the communication system 1, the upper-level device 10 is a highest level device (an upper-level-side device). The upper-level device 10 and the terminal station device 11 are connected in one-to-one correspondence. The upper-level device 10 transmits main signals of downlink communication to the terminal station device 11. The main signals of downlink communication may include uplink communication scheduling information (bandwidth allocation information or the like) of the user device 15. The upper-level device 10 receives main signals of uplink communication from the terminal station device 11.

The terminal station device 11 is an optical line terminal (OLT).

In the configuration of FIG. 1, the terminal station device 11 and terminal devices 13-1 to 13-P (P is an integer of 2 or more) are connected in one-to-multiple correspondence via the optical fiber 120 and the relay unit 12. However, the terminal station device 11 and the terminal device 13 may be connected in one-to-one correspondence via the optical fiber 120 and the relay unit 12. Hereinafter, a communication line between the terminal station device 11 and the terminal device 13 will be referred to as a "relay network 30."

The relay unit 12 is an optical splitter. The relay unit 12 branches an optical signal received from the terminal station device 11 via the optical fiber 120-0 using the optical fibers 120-1 to 120-P and transmits the optical signals to the terminal devices 13-1 to 13-P. Moreover, the relay unit 12 transmits optical signals received from the terminal devices 13-1 to 13-P via the optical fibers 120-1 to 120-P to the terminal station device 11.

The relay unit 12 may be a multiplexing device that multiplexes or demultiplexes optical signals.

The terminal device 13 is an optical network unit (ONU). A terminal device 13-i (i is 1 to P) and a lower-level device 14-i are connected in one-to-one correspondence.

The lower-level device 14 is a communication device and, for example, is a remote radio head. The lower-level device 14 and a plurality of user devices 15 are connected in one-to-multiple correspondence. That is, the lower-level device 14 (an accommodation source device) accommodates the plurality of user devices 15. Hereinafter, a communication line between the lower-level device 14 and the user device 15 will be referred to as a "lower-level network 40."

The user device 15 is a communication device such as a smartphone terminal, a tablet terminal, or a computer terminal. In the communication system 1, the user devices 15-1 to 15-U (U is an integer of 2 or more) are the lowest level devices (low-level-side devices).

A configuration example of the terminal station device 11 will be described.

Figure 2:
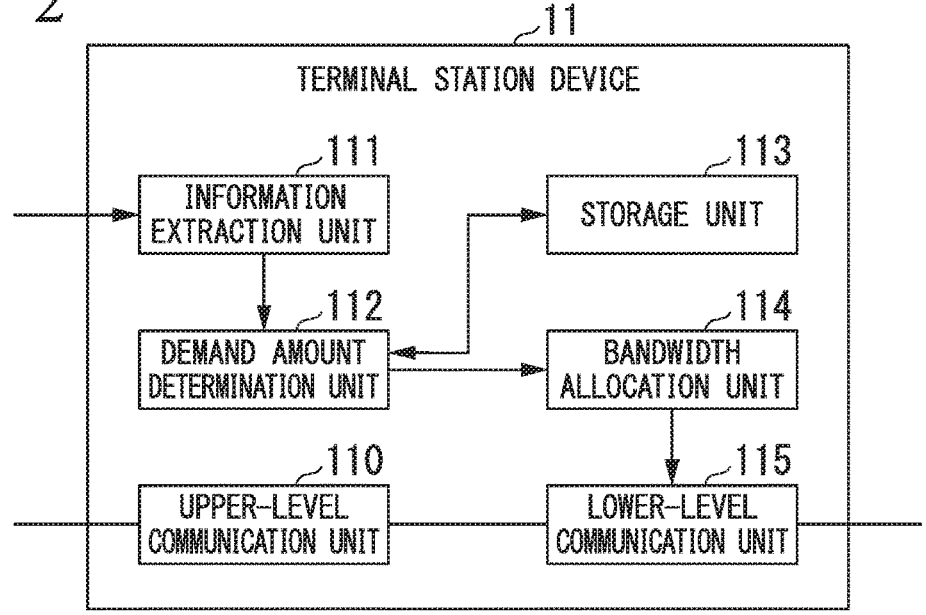
FIG. 2 is a diagram showing a configuration example of a terminal station device according to the first embodiment.

FIG. 2 is a diagram showing a configuration example of the terminal station device 11 according to the first embodiment of the present invention. The terminal station device 11 includes an upper-level communication unit 110, an information extraction unit 111, a demand amount determination unit 112, a storage unit 113, a bandwidth allocation unit 114, and a lower-level communication unit 115.

Some or all of the upper-level communication unit 110, the information extraction unit 111, the demand amount determination unit 112, the bandwidth allocation unit 114, and the lower-level communication unit 115 are, for example, software functional units that function when a processor such as a central processing unit (CPU) executes a program stored in a memory, for example. Moreover, some or all of these functional units may be hardware functional units such as large-scale integrated circuit (LSI) or an application specific integrated circuit (ASIC).

The upper-level communication unit 110 transmits main signals received from the upper-level device 10 to the lower-level communication unit 115. The upper-level communication unit 110 transmits main signals received from the lower-level communication unit 115 to the upper-level device 10.

When the uplink communication scheduling information (bandwidth allocation information or the like) of the user device 15 is included in the main signal, the upper-level communication unit 110 may extract the uplink communication scheduling information of the user device 15 from the main signal and transmit the information to the information extraction unit 111.

The information extraction unit 111 receives the uplink communication scheduling information of the user device 15 from the upper-level device 10. The information extraction unit 111 extracts, for each of the user devices 15, information on the amount of information (hereinafter referred to as an "allowable lower-level network transmission amount") of signals for which transmission of uplink communication of the user device 15 is allowed in the lower-level network 40 from the uplink communication scheduling information of the user device 15.

Moreover, the information extraction unit 111 may extract identification information indicating a correlation between the upper-level device 10 and the lower-level device 14 from the uplink communication scheduling information.

Figure 3:
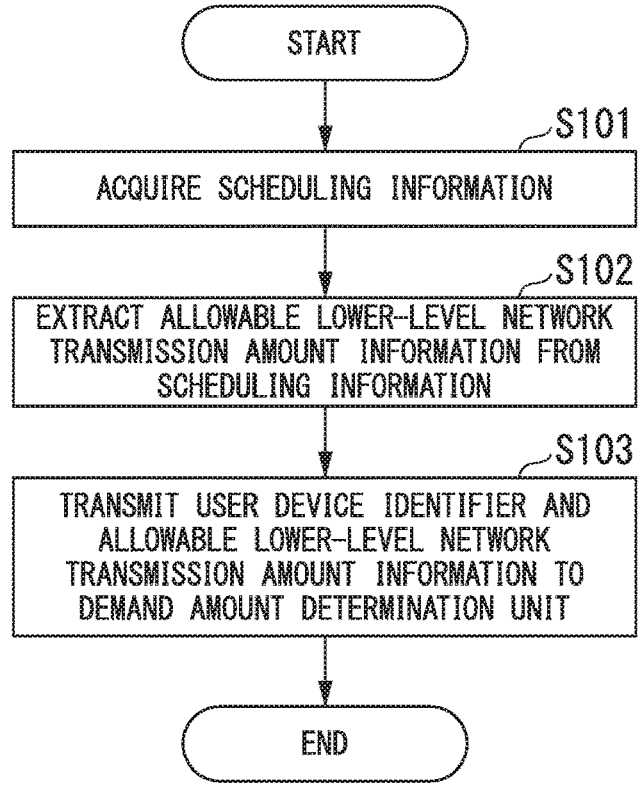
FIG. 3 is a flowchart showing a procedure of an operation of an information extraction unit according to the first embodiment.

FIG. 3 is a flowchart showing a procedure of an operation of the information extraction unit 111 according to the first embodiment of the present invention.

The information extraction unit 111 receives uplink communication scheduling information of the user device 15 from the upper-level device 10 (step S101). The information extraction unit 111 extracts an allowable lower-level network transmission amount from the uplink communication scheduling information of the user device 15 (step S102). Moreover, the information extraction unit 111 transmits an identifier (hereinafter referred to as a "user device identifier") of the user device 15 and information on the allowable lower-level network transmission amount to the demand amount determination unit 112 in correlation with each other (step S103).

The demand amount determination unit 112 determines a bandwidth (hereinafter referred to as a "relay network demand amount") demanded for uplink communication of the terminal device 13 in the relay network 30 on the basis of the information on the allowable lower-level network transmission amount extracted by the information extraction unit 111.

Figure 4:
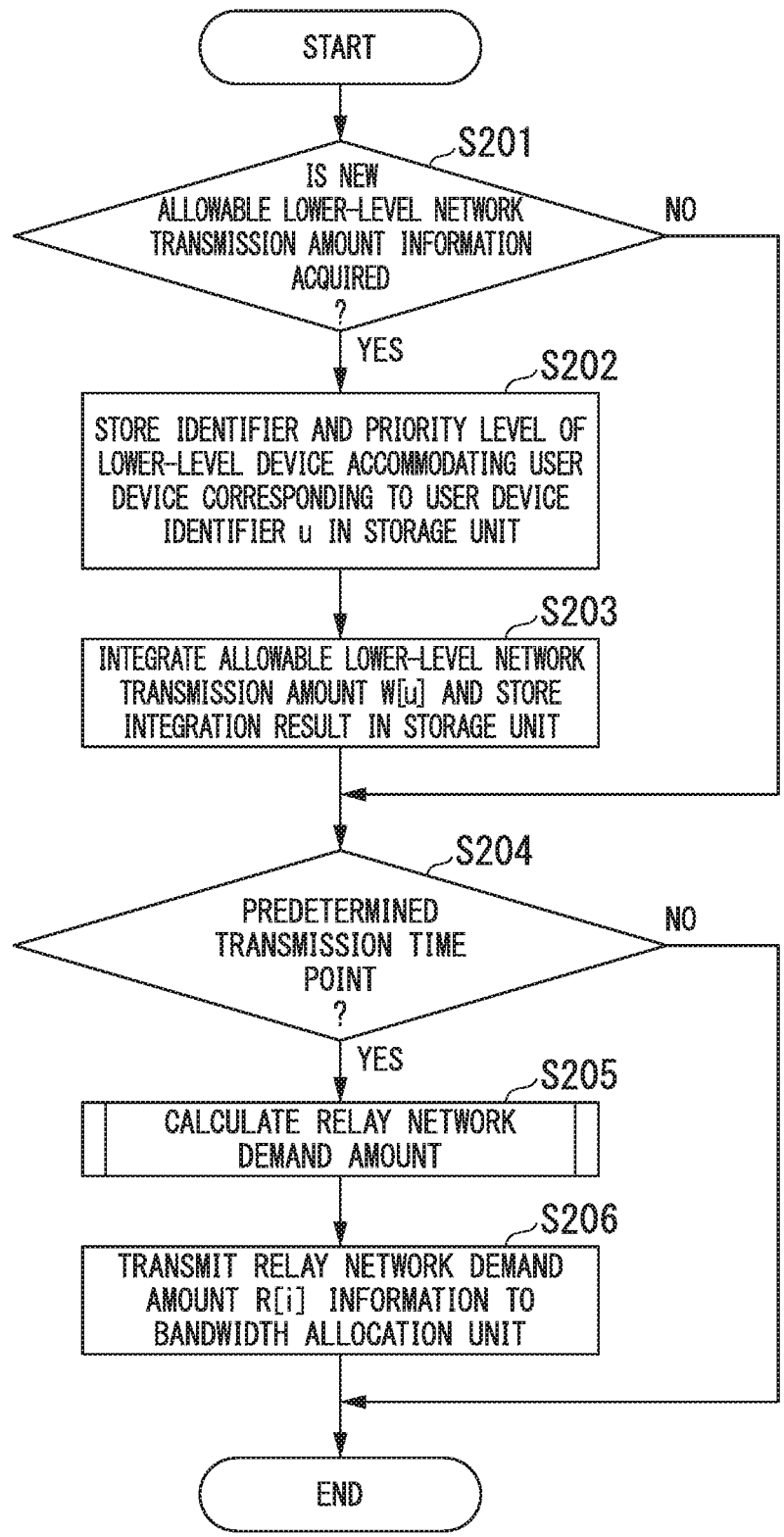
FIG. 4 is a flowchart showing a procedure of an operation of a demand amount determination unit according to the first embodiment.

FIG. 4 is a flowchart showing a procedure of an operation of the demand amount determination unit 112 according to the first embodiment of the present invention.

The demand amount determination unit 112 determines whether new information on an allowable lower-level network transmission amount is acquired (step S201). When new information on the allowable lower-level network transmission amount information is not acquired (step S201: NO), the demand amount determination unit 112 proceeds to step S204.

When new information on the allowable lower-level network transmission amount is acquired (step S201: YES), the demand amount determination unit 112 stores an identifier (hereinafter referred to as a "lower-level device identifier") of the lower-level device 14 that accommodates the user device 15 corresponding to a user device identifier u in the storage table of the storage unit 113.

The lower-level device identifier is, for example, a MAC (Media Access Control) address or an IP (Internet Protocol) address. The lower-level device identifier may be an identifier which is uniquely assigned to a network in an arbitrary range.

The demand amount determination unit 112 may store apriority level L of the lower-level device 14 that accommodates the user device 15 corresponding to the user device identifier u in the storage table of the storage unit 113. The priority level L is a priority order corresponding to a latency allowed by a service contracted by the user of the user device 15. The priority level may be a single level and may be a plurality of levels (step S202).

The demand amount determination unit 112 integrates allowable lower-level network transmission amounts W[u] of each of user device identifiers u and stores an integration result (sum) thereof in the storage table of the storage unit 113 (step S203).

Figures 5, 6:
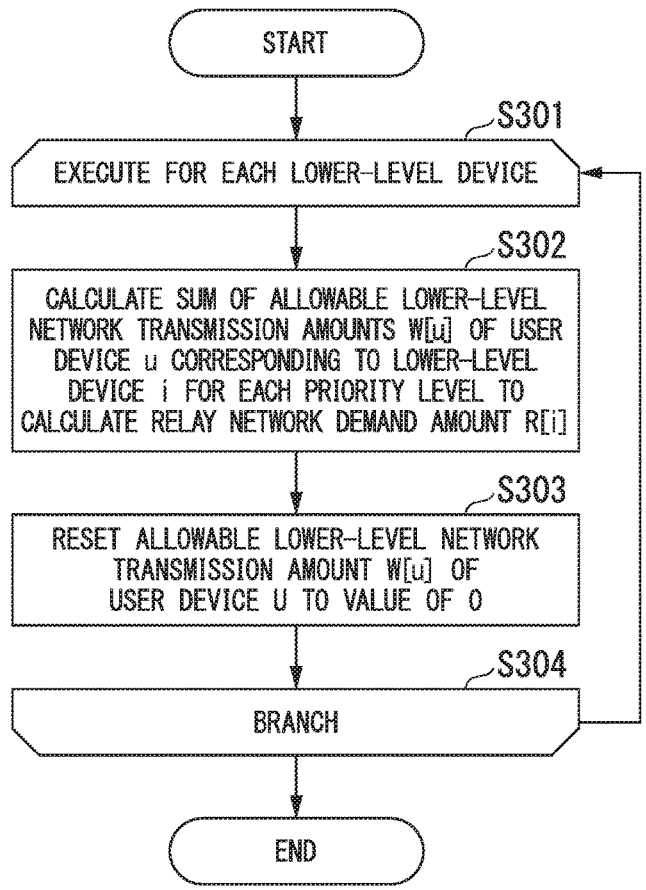
FIG. 5 is a diagram showing an example of a storage table according to the first embodiment.
FIG. 6 is a flowchart showing an example of a procedure of calculating a relay network demand amount according to the first embodiment.

FIG. 5 is a diagram showing an example of a storage table according to the first embodiment of the present invention.

The demand amount determination unit 112 stores various pieces of data in the storage table. Items of the storage table includes the user device identifier u, a lower-level device identifier i, the priority level L, and the allowable lower-level network transmission amount W[u].

In FIG. 5, as an example, a user device identifier "u1," a lower-level device identifier "$I_1$," a priority level "L1," and an allowable lower-level network transmission amount "W[u1]" are correlated.

Referring back to FIG. 4, the description of the procedure of the operation of the demand amount determination unit 112 will be continued. The demand amount determination unit 112 determines whether a present time point is the same as a predetermined transmission time point. The transmission time point is a time point at which the bandwidth allocation unit 114 periodically executes a bandwidth allocation process (step S204). When the present time point is not the same as the transmission time point (step S204: NO), the demand amount determination unit 112 ends the process shown in FIG. 4.

When the present time point is the same as the transmission time point (step S204: YES), the demand amount determination unit 112 calculates a relay network demand amount R[i] on the basis of each of the items of the storage table by referring to the storage table stored in the storage unit 113 (step S205). The demand amount determination unit 112 transmits information on the relay network demand amount R[i] to the bandwidth allocation unit 114 (step S206).

FIG. 6 is a flowchart showing an example of a procedure of calculating the relay network demand amount R[i] for each priority level L according to the first embodiment of the present invention.

That is, FIG. 6 is a flowchart showing details of step S205 shown in FIG. 4. The demand amount determination unit 112 executes processes of steps S302 and S303 for each of lower-level devices 14 (step S301).

The demand amount determination unit 112 calculates the sum of the allowable lower-level network transmission amounts W[u] of the user device 15-u accommodated by the lower-level device 14-i for each of the priority levels L. The demand amount determination unit 112 sets the relay network demand amount R[i] (in this case, also represented as R[i][L] or the like) of each of the priority levels L of the lower-level device 14-i to the same value as the sum of the allowable lower-level network transmission amounts W[u] of each of the priority levels L (step S302). After that, the demand amount determination unit 112 resets the allowable lower-level network transmission amount W[u] of the user device 15-u to the value of 0 in the storage table shown in FIG. 5 (step S303). The demand amount determination unit 112 may calculate the sum of the allowable lower-level network transmission amounts W[u] of the user device 15-u accommodated by the lower-level device 14-i rather than calculating the same for each of the priority levels L. In this case, the demand amount determination unit 112 sets the relay network demand amount R[i] of the lower-level device 14-i to the same value as the sum of the allowable lower-level network transmission amounts W[u].

In a transmission process of the uplink communication signals of the lower-level device 14, overhead may sometimes occur depending on the uplink communication signals of the user device 15. The overhead mentioned herein indicates a signal other than the main signal of the uplink communication and, for example, is control information which is additionally appended to data transmission. Due to this, the amount of information or the like corresponding to the overhead may be added to or multiplied by the relay network demand amount R[i].

When the lower-level device 14 for which the relay network demand amount R[i] is not calculated exists, the demand amount determination unit 112 returns to step S301.

When the relay network demand amount R[i] has been calculated for all lower-level devices 14, the demand amount determination unit 112 ends the process shown in FIG. 6 (step S304).

For example, the storage unit 113 includes a nonvolatile storage medium (non-transitory recording medium) such as a read only memory (ROM), a flash memory, or a hard disk drive (HDD). For example, the storage unit 113 may include a volatile storage medium such as a random access memory (RAM) or a register. For example, the storage unit 113 may store a program for allowing a software functional unit to function. For example, the storage unit 113 stores the storage table. The storage unit 113 may store information indicating a connection relation of the upper-level device 10, the terminal station device 11, the terminal device 13, the lower-level device 14, and the user device 15 in advance.

The bandwidth allocation unit 114 calculates a transmission start time point S[i,n] (an allowed relay network transmission start time point) of the uplink communication of the terminal device 13 and calculates the amount of information (hereinafter referred to as an "allowable amount of relay network transmission") of signals for which transmission of uplink communication of the terminal device 13 is allowed in the relay network 30 so that a waiting period during which the terminal device 13 waits for transmission of uplink communication signals is equal in all terminal devices 13.

Figure 7:
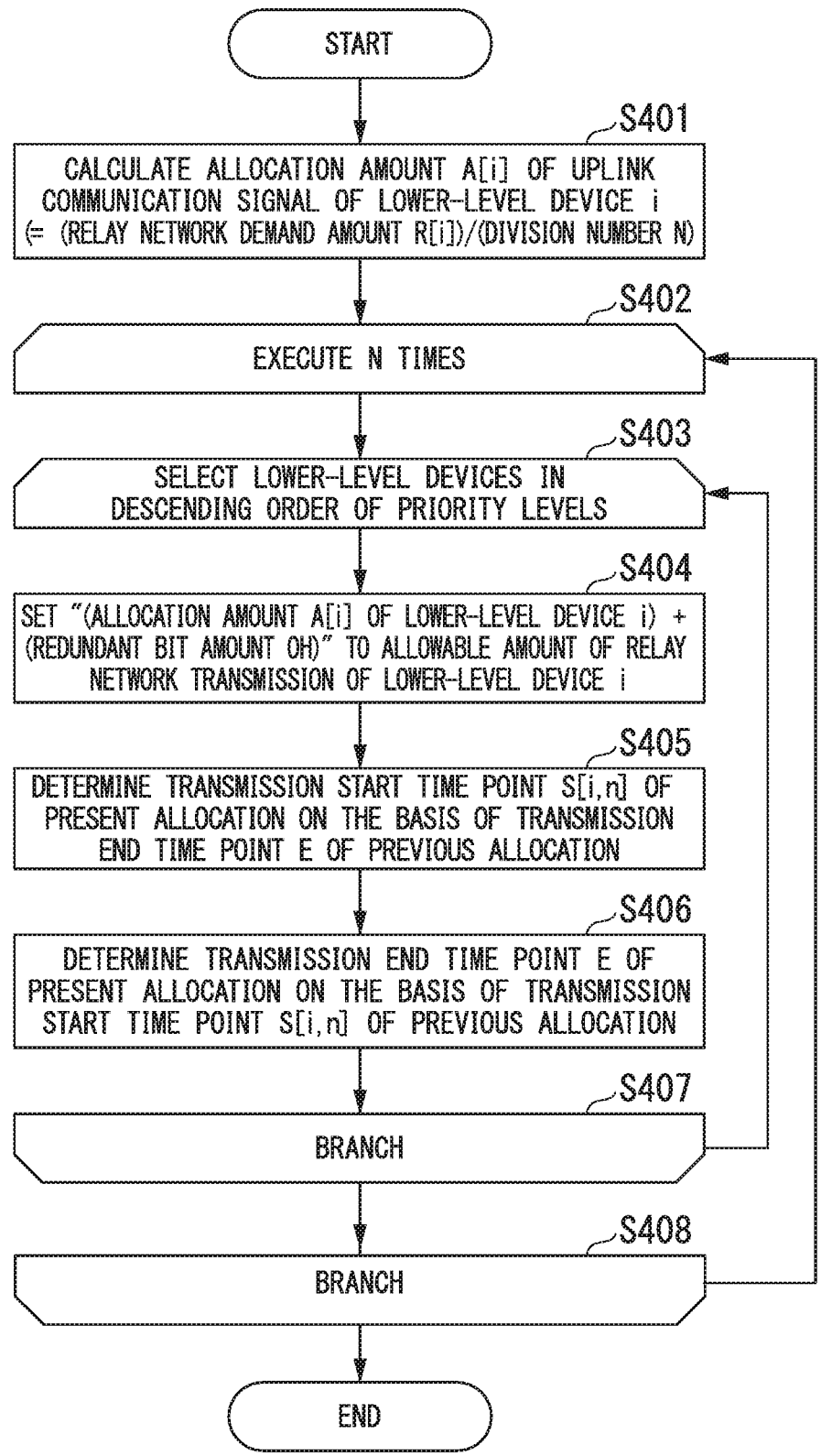
FIG. 7 is a flowchart showing a procedure of an operation of a bandwidth allocation unit according to the first embodiment.

FIG. 7 is a flowchart showing a procedure of an operation of the bandwidth allocation unit 114 according to the first embodiment of the present invention.

The bandwidth allocation unit 114 can decrease latency of the uplink communication of the terminal device 13 by executing the procedure of the operation shown in FIG. 7.

The bandwidth allocation unit 114 calculates an allocation amount A[i] of uplink communication signals of the lower-level device 14-i. The allocation amount A[i] is an amount obtained by dividing the relay network demand amount R[i] by a predetermined division number N (step S401). The bandwidth allocation unit 114 repeatedly executes steps S403 to S406 the division number N times (step S402).

First, the bandwidth allocation unit 114 selects the lower-level devices 14 in descending order of the priority levels L. Moreover, the bandwidth allocation unit 114 repeatedly executes steps S404 to S406 for each of the selected lower-level devices 14 (step S403).

The bandwidth allocation unit 114 sets an addition result (the amount of signal information) obtained by adding a redundant bit amount OH to the allocation amount A[i] of the uplink communication of the lower-level device 14-i as the allowable amount of relay network transmission of the lower-level device 14-i.

The redundant bit amount OH is a bit length obtained by summing a parity length, which is applied when error correction, such as forward error correction (FEC) is performed, an additional bit length, which corresponds to a header applied when the relay network 30 performs encoding, a redundant bit length, which corresponds to a period required for stable turning on or off of an optical transmitter included in the terminal device 13, and a synchronization bit length, which is required for synchronization between a clock of a receiver (that implements a reception function of the lower-level communication unit 115) included in the terminal station device 11 and the uplink communicators signal of the terminal device 13 (step S404).

The bandwidth allocation unit 114 determines the transmission start time point S[i,n] (n is a counter value indicating the number of repetitive executions and is between 1 and the division number N) of a present allocation on the basis of a transmission end time point E of a previous allocation. For example, as shown in Equation (1), the bandwidth allocation unit 114 sets the transmission end time point E of the previous allocation to the transmission start time point S[i,n] of the present allocation.

Transmission start time point S[i,n] of present allocation =Transmission end time point E of previous allocation (1)

An initial value of the transmission start time point S[i,n] is set to a time point obtained by adding a fixed period to a start time point of an execution of the procedure of the operation shown in FIG. 7 so that the transmission start time point is at least later than a time point at which the terminal device 13 receives the uplink communication signal from the lower-level device 14 (step S405).

The bandwidth allocation unit 114 determines the transmission end time point E of the present allocation on the basis of the transmission start time point S[i,n] of the present allocation.

The bandwidth allocation unit 114 multiplies the allowable amount of relay network transmission (=Allocation amount A[i]+Redundant bit amount OH) of the lower-level device 14-i by a coefficient K. The coefficient K is in units that are obtained by dividing time by a bit length. As shown in Equation (2), the bandwidth allocation unit 114 sets, as the transmission end time point E of the present allocation, a result obtained by adding the transmission start time point S[i,n] of the present allocation to the result of multiplication of the allowable amount of relay network transmission of the lower-level device 14-i and the coefficient K (step S406).

Transmission end time point E of present allocation =Transmission start time point S[i,n] of present allocation +Coefficient K (Allocation amount A[i]+Redundant bit amount OH) (2)

When there is the lower-level device 14 for which the transmission start time point S[i,n] of the present allocation is not determined, the bandwidth allocation unit 114 returns to step S403. When there are no lower-level devices 14 for which the transmission start time point S[i,n] of the present allocation is not determined, the bandwidth allocation unit 114 proceeds to step S408 (step S407).

When steps S403 to S407 are not executed repeatedly the division number N times, the bandwidth allocation unit 114 returns to step S402. When the steps were executed repeatedly the division number N times, the procedure of the operation shown in FIG. 7 ends (step S408).

The bandwidth allocation unit 114 transmits information on the transmission start time point S[i,n] of the uplink communication of the terminal device 13 to the lower-level communication unit 115. Moreover, the bandwidth allocation unit 114 transmits the information on the allowable amount of relay network transmission of each of the terminal devices 13 to the lower-level communication unit 115.

Referring back FIG. 2, the description of the configuration example of the terminal station device 11 will be continued. The lower-level communication unit 115 transmits the main signal of the downlink communication received from the upper-level communication unit 110 to the terminal device 13 via the relay network 30.

The lower-level communication unit 115 transmits the main signal of the uplink communication received from the terminal device 13 via the relay network 30 to the upper-level communication unit 110.

The lower-level communication unit 115 acquires the information on the transmission start time point S[i,n] of the uplink communication of the terminal device 13 from the bandwidth allocation unit 114. The lower-level Communication unit 115 transmits the information on the transmission start time point S[i,n] of the uplink communication of the terminal device 13 to the terminal device 13 via the relay network 30.

Moreover, the lower-level communication unit 115 acquires information on the allowable amount of relay network transmission of each of the terminal devices 13 from the bandwidth allocation unit 114. The lower-level communication unit 115 transmits the information on the allowable amount of relay network transmission of each of the terminal devices 13 to the terminal device 13 via the relay network 30.

FIG. 8 is a sequence diagram showing an example of the procedure of an operation of the communication system according to the first embodiment.

The upper-level device 10 transmits the uplink communication scheduling information of the user device 15 to the upper-level communication unit 110 of the terminal station device 11 as a main signal of the downlink communication (step S501). The terminal station device 11 transmits the uplink communication scheduling information of the user device 15 to the relay unit 12 as the main signal of the downlink communication (step S502). The relay unit 12 transmits the uplink communication scheduling information of the user device 15 to the terminal device 13 as the main signal of the downlink communication (step S503).

The terminal device 13 transmits the uplink communication scheduling information of the user device 15 to the lower-level device 14 as the main signal of the downlink communication (step S504). Moreover, the lower-level device 14 transmits the uplink communication scheduling information of the user device 15 to the user device 15 as the main signal of the downlink communication (step S505).

The user device 15 acquires the uplink communication scheduling information of the user device 15. The user device 15 wirelessly transmits the main signal of the uplink communication to the lower-level device 14 after waiting for a predetermined standby period α after acquiring the uplink communication scheduling information of the user device 15. For example, the standby period α is 4 ms in the case of LTE or the like (step S506).

The upper-level device 10 transmits the uplink communication scheduling information of the user device 15 to the information extraction unit 111 of the terminal station device 11 so that the terminal station device 11 calculates the allowable amount of relay network transmission (step S507). In step S501, The upper-level device 10 may transmit the uplink communication scheduling information of the user device 15 to the information extraction unit 111 of the terminal station device 11 (as well as transmitting the uplink communication scheduling information to the upper-level communication unit 110).

The information extraction unit 111 extracts the information on the allowable lower-level network transmission amount of each of the user devices 15 from the uplink communication scheduling information of the user device 15 (step S508). The demand amount determination unit 112 determines the relay network demand amount on the basis of the allowable lower-level network transmission amount of each of the user devices 15 (step S509).

The bandwidth allocation unit 114 calculates the allowable amount of relay network transmission and the transmission start time point S[i,n] for a present allocation of the uplink communication of the terminal device 13 (step S510). The lower-level communication unit 115 transmits the information on the transmission start time point S[i,n] of the uplink communication of the terminal device 13 and the information on the allowable amount of relay network transmission for each of the terminal devices 13 to the relay unit 12 for each of the terminal devices 13 (step S511).

The relay unit 12 transmits the information on the transmission start time point S[i,n] of the uplink communication of the terminal device 13 and the information on the allowable amount of relay network transmission of each of the terminal devices 13 to the terminal device 13 (step S512). The terminal device 13 determines the bandwidth of the uplink communication on the basis of the acquired information on the allowable amount of relay network transmission (step S513).

The lower-level device 14 transmits the main signal (see step S506) of the uplink communication as described above to the terminal device 13 (step S514). When a present time point is the same as the transmission start time point S[i,n], the terminal device 13 transmits the main signal of the uplink communication to the relay unit 12 according to the determined bandwidth (step S515).

The relay unit 12 transmits the main signal of the uplink communication to the terminal station device 11 (step S516). Moreover, the lower-level communication unit 115 of the terminal station device 11 transmits the main signal of the uplink communication to the upper-level device 10 via the upper-level communication unit 110 (step S517). The upper-level device 10 acquires the main signal of the uplink communication (step S518).

As described above, in the terminal station device 11 of the first embodiment in which the terminal device 13 connected to the lower-level device 14, which accommodates the plurality of user devices 15, is connected on a lower level side and the upper-level device 10 is contacted on an upper-level side, the information extraction unit 111 extracts information on a bandwidth allocation of the uplink communication of each of the user devices 15 from information notified by the upper-level device 10 on the uplink communication of the user device 15.

Moreover, the storage unit 113 stores identification information (the lower-level device identifier) of the lower-level device 14 connected to the terminal device 13 and identification information (the user device identifier) of the plurality of user devices 15 in correlation with each other.

Moreover, the demand amount determination unit 112 determines a bandwidth (relay network demand amount) demanded for the uplink communication of the terminal device 13 on the basis of the information on the bandwidth allocation of the uplink communication for each of the user devices 15, the identification information of the lower-level device 14, and the identification information of the plurality of user device 15.

Furthermore, the bandwidth allocation unit 114 allocates a start time point (transmission start time point) of the uplink communication of the terminal device 13 and the amount of information (allowable amount of relay network transmission) of signals for which transmission of the uplink communication of the terminal device 13 is allowed to the terminal device 13 on the basis of the bandwidth demanded for the uplink communication of the terminal device 13.

In this way, the terminal station device 11 and the bandwidth allocation method according to the first embodiment can improve utilization efficiency of the bandwidth of the communication system in which the lower-level device 14 and the user devices 15 are connected in one-to-multiple correspondence.

As described above, in the terminal station device 11 and the bandwidth allocation method according to the first embodiment, bandwidth allocation is performed on the terminal device 13 on the basis of the scheduling information (bandwidth allocation information or the like) from the upper-level device 10 to the lower-level device 14. In this case, it is possible to utilize bandwidth of a PON or the like via signal control on the lower-level device 14. Therefore, the terminal station device 11 and the bandwidth allocation method according to the first embodiment can decrease latency of uplink communication signal transmission.

Moreover, the terminal station device 11 of the first embodiment further includes the lower-level communication unit 115 that receives the identification information of the lower-level device 14 connected on the lower level side of the terminal device 13 from the terminal device 13. The information extraction unit 111 extracts information (correspondence information) indicating the correspondence between the upper-level device 10 and the lower-level device 14 from identification information received from the upper-level device 10 as uplink communication information of the user device 15. The storage unit 113 stores the identification information based on the correspondence information.

Furthermore, in the terminal station device 11 of the first embodiment, the demand amount determination unit 112 calculates the sum of the amount of information of signals for which transmission of the uplink communication of the user device 15 is allowed for each of the terminal devices 13 correlated with the user device 15 and uses the sum as the bandwidth demanded for the uplink communication of the terminal device 13. In the terminal station device 11 of the first embodiment, the bandwidth allocation unit 114 subdivides the bandwidth demanded for the uplink communication of the terminal device 13 and allocates a start time point of the uplink communication of the terminal device 13 and the amount of information of signals for which transmission of the uplink communication of the terminal device 13 is allowed to the terminal device 13 repeatedly a plurality of times.

[Second Embodiment]

In a second embodiment, a scheduling information extraction process, a storage table, a relay network demand amount calculation process, and a method of determining the transmission start time point S[i,n] of uplink communication of the terminal device 13 are different from those of the first embodiment. In the second embodiment, the differences from the first embodiment will be described.

In the second embodiment, the terminal station device 11 predicts an arrival time point of an uplink communication signal transmitted from the lower-level device 14 to the terminal device 13 (that is, a time point at which the terminal device 13 receives the uplink communication signal).

The terminal station device 11 can further decrease latency of the uplink communication signal transmission in comparison to the first embodiment.

In the second embodiment, a case in which a time interval or a time period in which the upper-level device 10 executes scheduling (bandwidth allocation) of the uplink communication of the user device 15 is the same as a time interval or a time period in which the bandwidth allocation unit 114 of the terminal station device 11 calculates an allowable amount of relay network transmission will be described.

FIG. 9 is a flowchart showing a procedure of an operation of an information extraction unit according to the second embodiment of the present invention.

The information extraction unit 111 of the terminal station device 11 acquires uplink communication scheduling information of the user device 15 (step S601). The information extraction unit 111 extracts the allowable lower-level network transmission amount W[u] from the scheduling information (step S602).

The information extraction unit 111 calculates a time point at which the uplink communication signal arrives at the terminal device 13-i from the lower-level device 14-i (i=1 to P) (that is, a time point (hereinafter referred to as an "uplink signal reception time point") at which the terminal device 13-i receives the uplink communication signal from the lower-level device 14-i).

Specifically, the information extraction unit 111 calculates an uplink signal reception time point Z[u] on the basis of a time point at which the information extraction unit 111 receives the scheduling information, a signal transmission period of the relay network 30, a standby period α until the uplink communication signal is transmitted after the user device 15 receives the scheduling information, and a period required for a round trip of a signal (details will be described later).

When a transmission time point of a main signal of downlink communication from the upper-level device 10 to the terminal station device 11 is the same as the transmission time point of the scheduling information from the upper-level device 10 to the terminal station device 11, the uplink signal reception time point Z[u] is represented by Equation (3).

$$Z[u]=T[u]+D[i]+\alpha+\beta \qquad (3)$$

Here, T[u] indicates a time point at which the terminal station device 11 receives the scheduling information from the upper-level device 10. D[i] indicates a transmission period of downlink communication signals from the terminal station device 11 to the terminal device 13. α indicates a standby period until the user device 15 transmits the uplink communication signal. β indicates a period which is the sum of a period required for a round trip of signals between the terminal device 13 and the lower-level device 14 and a period required for a round trip of a signal between the lower-level device 14 and the user device 15.

When the transmission time point of the main signal of the downlink communication from the upper-level device 10 to the terminal station device 11 is different from the transmission time point of the scheduling information from the upper-level device 10 to the terminal station device 11, the upper-level device 10 separately notifies the information extraction unit 111 of the terminal station device 11 of the scheduling information and a time difference M[u] obtained by subtracting the main signal transmission time point of the downlink communication from the scheduling information transmission time point from the scheduling information. The time difference M[u] has a positive value when the scheduling information transmission time point is later than the main signal transmission time point of the downlink communication, and has a negative value when the scheduling information transmission time point is earlier than the main signal transmission time point of the downlink communication. The information extraction unit 111 calculates a value by subtracting the time difference M[u] from the right side of Equation (3).

That is, when the transmission time point of the main signal of the downlink communication from the upper-level device 10 to the terminal station device 11 is different from the transmission time point of the scheduling information from the upper-level device 10 to the terminal station device 11, the uplink signal reception time point Z[u] is represented by Equation (4).

$$Z[u]=T[u]+D[i]+\alpha+\beta-M[u] \qquad (4)$$

When the terminal station device 11 is not notified of the time difference M[u] by the upper-level device 10, the information extraction unit 111 may use a fixed value as the time difference M[u], as shown in Equation (4).

In this way, the information extraction unit 111 calculates the uplink signal reception time point Z[u] on the basis of the time point T[u] at which the information extraction unit 111 receives the scheduling information, the signal transmission period D[i] of the relay network 30, the standby period α until the main signal of the uplink communication is transmitted after the user device 15 receives the scheduling information, the period required for a round trip of the signal, and the time difference M[u] (step S603).

The information extraction unit 111 transmits the user device identifier u, the information on the allowable lower-level network transmission amount W[u], and the information on the uplink signal reception time point Z[u] to the demand amount determination unit 112 (step S604).

FIG. 10 is a diagram showing an example of the storage table according to the second embodiment of the present invention.

The demand amount determination unit 112 stores various pieces of data in the storage table. Items of the storage table include the user device identifier u, the lower-level device identifier i, the priority level L, an allowable lower-level network transmission amount W[u]#F (F is the number of pieces of information on the allowable lower-level network transmission amount that the information extraction unit 111 transmits to the demand amount determination unit 112), and an uplink signal reception time point Z[u]#G (G is the number of pieces of information on the uplink signal reception time point that the information extraction unit 111 transmits to the demand amount determination unit 112).

When a plurality of pieces of information on the allowable lower-level network transmission amount are received from the information extraction unit 111, the demand amount determination unit 112 separately stores the plurality of pieces of information on the allowable lower-level network transmission amount. When a plurality of pieces of information on the uplink signal reception time point are received from the information extraction unit 111, the demand amount determination unit 112 separately stores the plurality of pieces of information on the uplink signal reception time point.

In FIG. 10, as an example, a user device identifier "u1," a lower-level device identifier "$I_1$," a priority level "L1," an allowable lower-level network transmission amount "W[u1]#1," and an uplink signal reception time point "Z[u]#1" are correlated with each other. Here, when the number of allowable lower-level network transmission amounts W[u] or uplink signal reception time points Z[u] is not 1, the number of "W[u1]" or "Z[u]" corresponding to the number of allowable lower-level network transmission amounts W[u] or uplink signal reception time points Z[u] are stored in the storage table.

Figure 11:
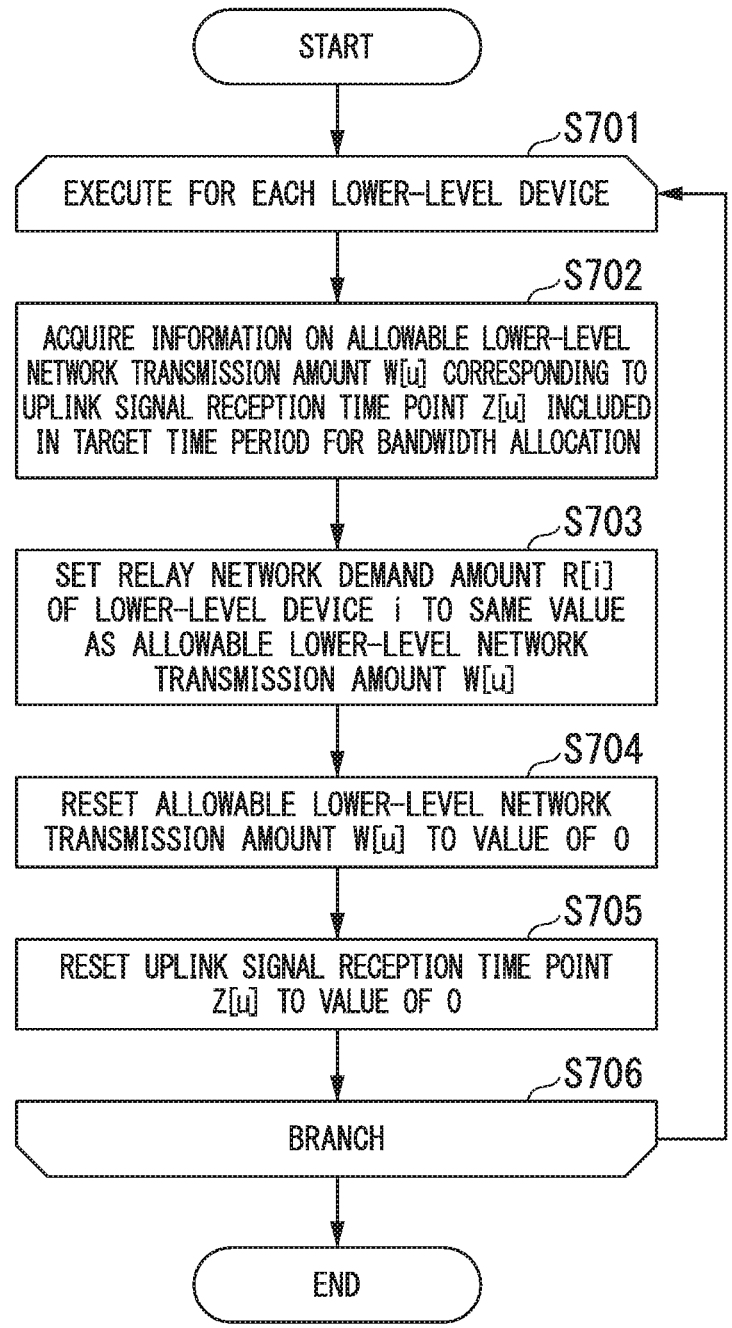
FIG. 11 is a flowchart showing an example of a procedure of calculating a relay network demand amount according to the second embodiment.

FIG. 11 is a flowchart showing an example of a procedure of calculating the relay network demand amount R[i] according to the second embodiment of the present invention.

That is, FIG. 11 is a flowchart showing the details of step S205 shown in FIG. 4. The demand amount determination unit 112 executes processes of steps S702 to S705 for each of the lower-level devices 14 (step S701).

The demand amount determination unit 112 acquires information on the allowable lower-level network transmission amount W[u] corresponding to the uplink signal reception time point Z[u] included in a time period which is a target of bandwidth allocation by referring to a storage table stored in the storage unit 113 (step S702).

Subsequently, the demand amount determination unit 112 sets the relay network demand amount R[i] of the lower-level device 14-i to the same value as the acquired allowable lower-level network transmission amount W[u] (step S703). The demand amount determination unit 112 resets the corresponding allowable lower-level network transmission amount W[u] in the storage table shown in FIG. 5 to the value of 0 (step S704).

Moreover, the demand amount determination unit 112 transmits information on the uplink signal reception time point Z[u] to the bandwidth allocation unit 114. The demand amount determination unit 112 resets the uplink signal reception time point Z[u] (a local variable) used for a calculation process of the demand amount determination unit 112 to the value of 0 (step S705).

When there is the lower-level device 14 for which the relay network demand amount R[i] is not calculated, the demand amount determination unit 112 returns to step S701. When there are no lower-level devices 14 for which the relay network demand amount R[i] is not calculated, the demand amount determination unit 112 ends the process shown in FIG. 11 (step S706).

The bandwidth allocation unit 114 determines the transmission start time point S[i,n] of the uplink communication of the terminal device 13 on the basis of the information on the uplink signal reception time point Z[u] received from the demand amount determination unit 112.

Figure 12:
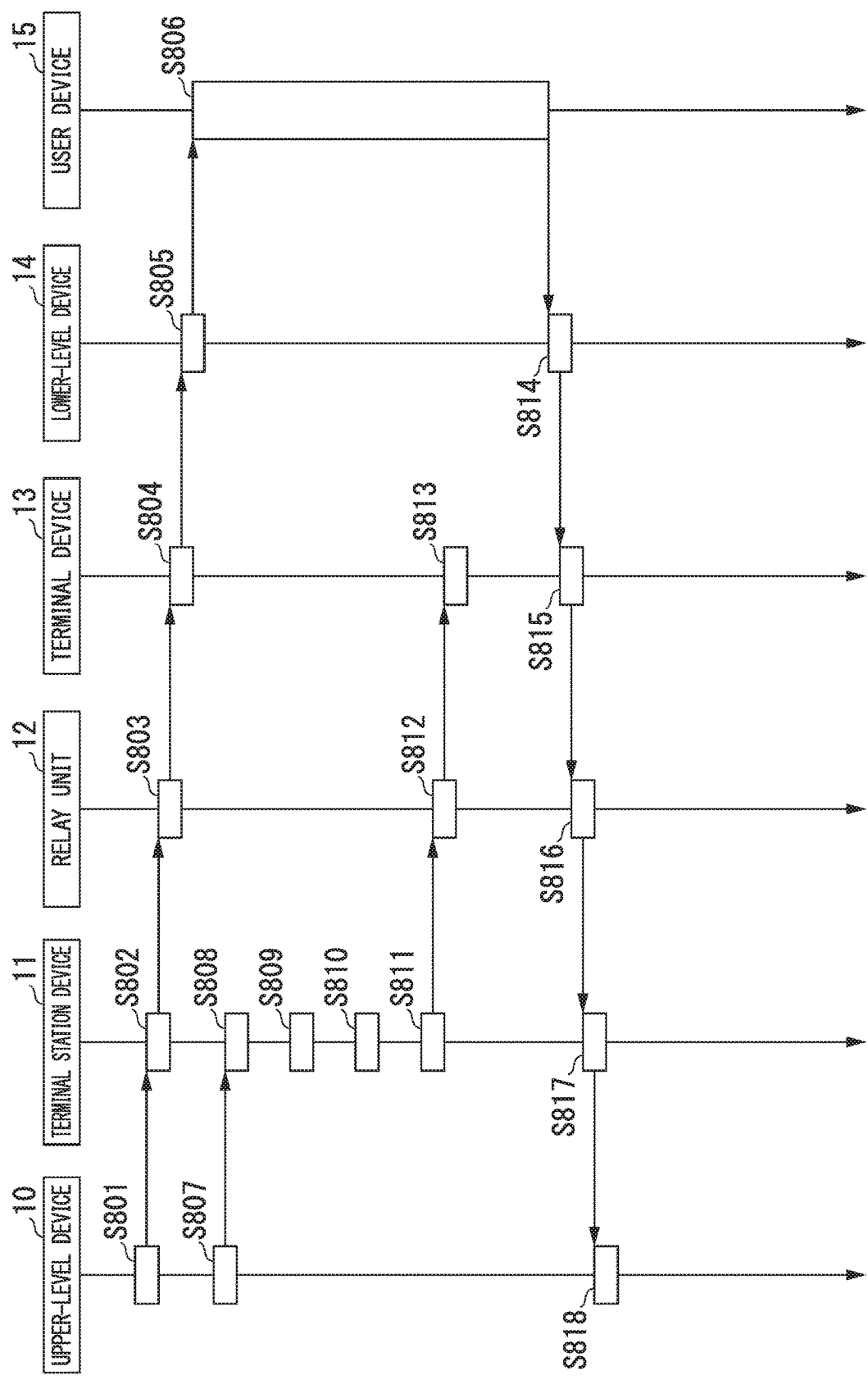
FIG. 12 is a sequence diagram showing an example of a procedure of an operation of a communication system according to the second embodiment.

FIG. 12 is a sequence diagram showing an example of a procedure of an operation of the communication system according to the second embodiment.

Since steps S801 to S808 are the same as steps S501 to S508 shown in FIG. 8, thus the subsequent steps will be described.

The demand amount determination unit 112 determines information on a relay network demand amount on the basis of the information on the allowable lower-level network transmission amount for each of the user devices 15. The demand amount determination unit 112 transmits the information on the uplink signal reception time point Z[u] to the bandwidth allocation unit 114 (step S809).

The bandwidth allocation unit 114 calculates the allowable amount of relay network transmission and the transmission start time point S[i,n] of the present allocation on the basis of the uplink signal reception time point Z[u] (step S810).

Steps S811 to S814 are the same as steps S511 to S514 shown in FIG. 8.

When a present time point is the same as the transmission start time point S[i,n], the terminal device 13 transmits the main signal of the uplink communication to the relay unit 12 according to a predetermined bandwidth. In the present embodiment, since accuracy of the transmission start time point S[i,n] is high, a standby period until the terminal device 13 transmits the uplink communication signal is short in comparison to step S515 shown in FIG. 8 (step S815).

Steps S816 to S818 are the same as steps S516 to S518 shown in FIG. 8.

As described above, the information extraction unit 111 according to the second embodiment extracts information on the amount of information of signals for which transmission of the uplink communication of the user device 15 is allowed from the information on the uplink communication of the user device 15, and calculates a time point at which the terminal device 13 receives uplink communication signals from the user device 15 on the basis of the time point at which the information extraction unit 111 receives the information on the uplink communication from the upper-level device 10 and a period (transmission period) required for signals to be transmitted between the terminal station device 11 and the terminal device 13. Moreover, the demand amount determination unit 112 determines a bandwidth (relay network demand amount) demanded for the uplink communication of the terminal device 13 on the basis of the amount of information of signals for which transmission of the uplink communication of the user device 15 is allowed and the time point (arrival time point) at which the terminal device 13 receives uplink communication signals from the user device 15.

In this way, according to the terminal station device 11 and the bandwidth allocation method of the second embodiment, it is possible to improve determination accuracy of the transmission start time point S[i,n]. According to the terminal station device 11 and the bandwidth allocation method of the second embodiment, it is possible to shorten the standby period until the terminal device 13 transmits uplink communication signals on the basis of the transmission start time point S[i,n] having high accuracy.

That is, the terminal station device 11 according to the second embodiment calculates the allowable amount of relay network transmission and the transmission start time point S[i,n] on the basis of the time point (the time point at which the uplink signal arrives at the terminal device 13) at which the terminal device 13 receives the uplink communication signals and the allowable lower-level network transmission amount described in the scheduling information.

Moreover, the demand amount determination unit 112 of the second embodiment sets the amount of information of signals for which transmission of the uplink communication of the user device 15 is allowed as the bandwidth demanded for the uplink communication of the terminal device 13 correlated with the user device 15 to which the terminal device 13 transmits uplink communication signals received in a specific time period.

[Third Embodiment]

In a third embodiment, a process of the demand amount determination unit 112 calculating the relay network demand amount R[i] is different from that of the second embodiment. In the third embodiment, the differences with the second embodiment will be described.

In the third embodiment, the terminal station device 11 predicts an arrival time point (that is, a time point at which the terminal device 13 receives uplink communication signals) of uplink communication signals transmitted from the lower-level device 14 to the terminal device 13. This is similar to the second embodiment.

Therefore, the terminal station device 11 can further decrease latency of uplink communication signal transmission in comparison to the first embodiment.

In the third embodiment, a case in which a time interval in which the upper-level device 10 executes scheduling (bandwidth allocation) of the uplink communication of the user device 15 is longer than a time interval in which the bandwidth allocation unit 114 of the terminal station device 11 calculates an allowable amount of relay network transmission will be described.

In this case, when the same process as the second embodiment is performed, it is possible that the user device 15 cannot transmit some of uplink communication signals corresponding to an allowable lower-level network transmission amount within a time interval in which the bandwidth allocation unit 114 calculates the allowable amount of relay network transmission.

Figure 13:
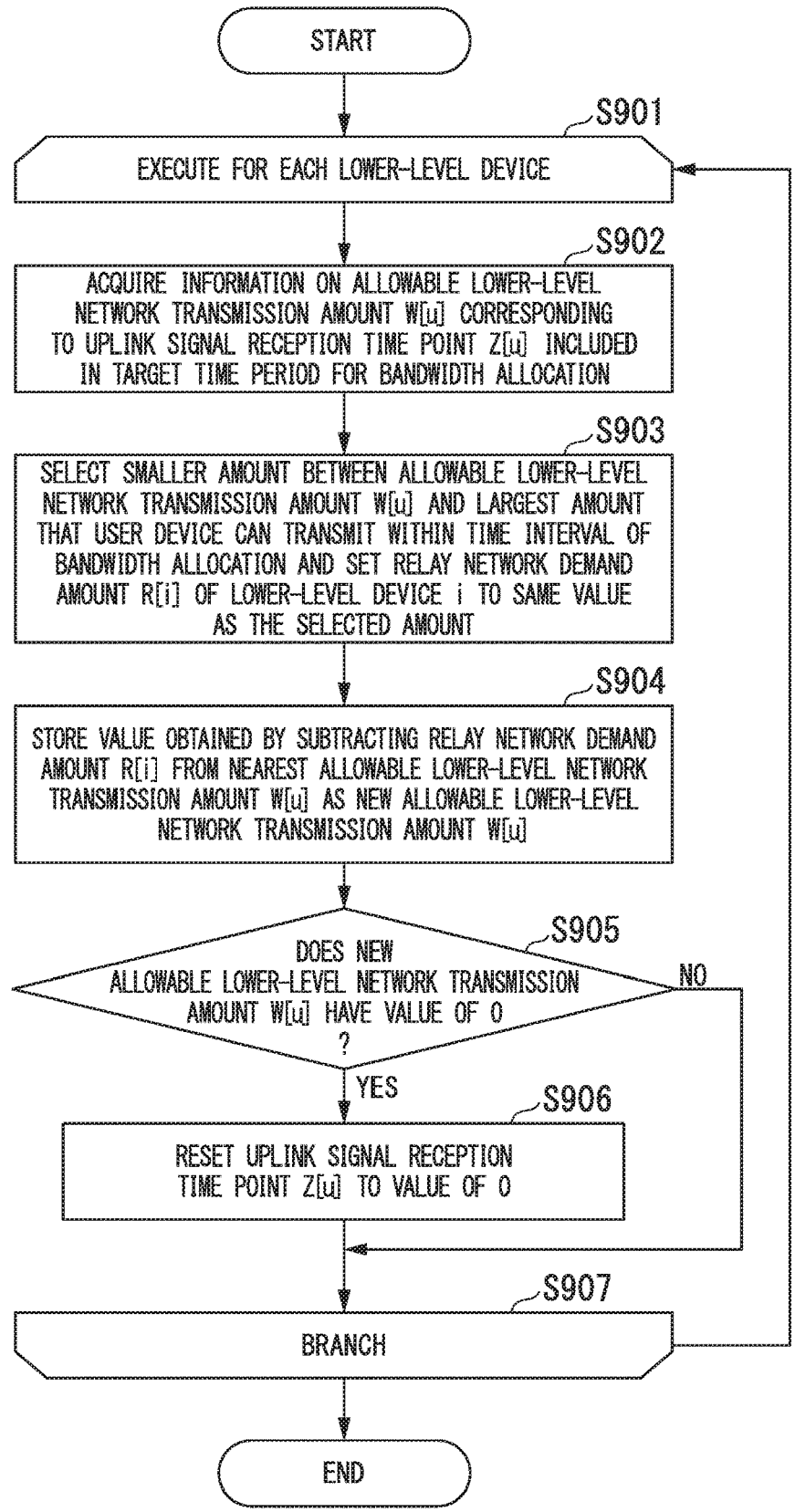
FIG. 13 is a flowchart showing an example of a procedure of calculating a relay network demand amount according to a third embodiment of the present invention.

FIG. 13 is a flowchart showing an example of a procedure of calculating a relay network demand amount according to the third embodiment.

That is, FIG. 13 is a flowchart showing the details of step S205 shown in FIG. 4. The demand amount determination unit 112 executes processes of steps S902 to S906 for each of the lower-level devices 14 (step S901). Step S902 is the same as step S702 shown in FIG. 11.

Subsequently, the demand amount determination unit 112 selects a smaller amount between the allowable lower-level network transmission amount W[u] and a largest amount (allocatable amount) that the user device 15 accommodated in the lower-level device 14-i can transmit within the time interval in which the bandwidth allocation unit 114 calculates (allocates a bandwidth) the allowable amount of relay network transmission. The demand amount determination unit 112 sets the relay network demand amount R[i] of the lower-level device 14-i to the same value as the selected amount (step S903).

The demand amount determination unit 112 stores a value obtained by subtracting the relay network demand amount R[i] from the nearest allowable lower-level network transmission amount W[u], which is stored in the storage table of the storage unit 113, in the storage table as a new allowable lower-level network transmission amount W[u] (step S904). The demand amount determination unit 112 determines whether the new allowable lower-level network transmission amount W[u] has the value of 0 (step S905).

When the new allowable lower-level network transmission amount W[u] does not have the value of 0 (that is, the new allowable lower-level network transmission amount W[u] is larger than the value of 0) (step S905: NO), the demand amount determination unit 112 proceeds to step S907. In this case, the uplink communication signal transmitted from the lower-level device 14 toward the terminal device 13 arrives at a subsequent time interval in which the bandwidth allocation unit 114 calculates the allowable amount of relay network transmission.

When the new allowable lower-level network transmission amount W[u] has the value of 0 (step S905: YES), the demand amount determination unit 112 resets the uplink signal reception time point Z[u] of the lower-level device 14-i to the value of 0 (step S906).

When there is the lower-level device 14 for which the relay network demand amount R[i] is not calculated, the demand amount determination unit 112 returns to step S901. When there are no lower-level devices 14 for which the relay network demand amount R[i] is not calculated, the demand amount determination unit 112 ends the process shown in FIG. 13 (step S907).

As described above, the demand amount determination unit 112 according to the third embodiment selects a smaller amount between the allowable lower-level network transmission amount W[u] and a largest amount (allocatable amount) that the user device 15 can transmit within a time interval in which the bandwidth allocation unit 114 calculates the allowable amount of relay network transmission (allocates a bandwidth). The demand amount determination unit 112 sets the relay network demand amount R[i] of the lower-level device 14-i to the same value as the selected amount.

In this way, according to the terminal station device 11 and the bandwidth allocation method of the third embodiment, it is possible to improve determination accuracy of the transmission start time point S[i,n] even when a time interval in which the upper-level device 10 executes scheduling (bandwidth allocation) of the uplink communication of the user device 15 is longer than a time interval in which the bandwidth allocation unit 114 of the terminal station device 11 calculates the allowable amount of relay network transmission.

That is, according to the terminal station device 11 and the bandwidth allocation method of the third embodiment, it is possible to shorten a standby period until the terminal device 13 transmits uplink communication signals on the basis of the transmission start time point S[i,n] having high accuracy even when the time interval in which the upper-level device 10 executes scheduling (bandwidth allocation) of the uplink communication of the user device 15 is longer than the time interval in which the bandwidth allocation unit 114 of the terminal station device 11 calculates the allowable amount of relay network transmission.

[Fourth Embodiment]

In a fourth embodiment, a process of the demand amount determination unit 112 calculating the relay network demand amount R[i] is different from that of the second and third embodiments. In the fourth embodiment, differences will be described.

In the fourth embodiment, the terminal station device 11 predicts an arrival time point of the uplink communication signal transmitted from the lower-level device 14 to the terminal device 13 (that is, a time point at which the terminal device 13 receives the uplink communication signal).

Therefore, the terminal station device 11 can further decrease latency of the uplink communication signal transmission in comparison to the first embodiment.

In the fourth embodiment, a case in which a time interval in which the upper-level device 10 executes scheduling (bandwidth allocation) of the uplink communication of the user device 15 is shorter than a time interval in which the bandwidth allocation unit 114 of the terminal station device 11 calculates an allowable amount of relay network transmission will be described.

In this case, there is a possibility that the plurality of user devices 15 connected to the same terminal device 13 transmits uplink communication signals corresponding to an allowable lower-level network transmission amount within the time interval in which the bandwidth allocation unit 114 calculates the allowable amount of relay network transmission.

Figure 14:
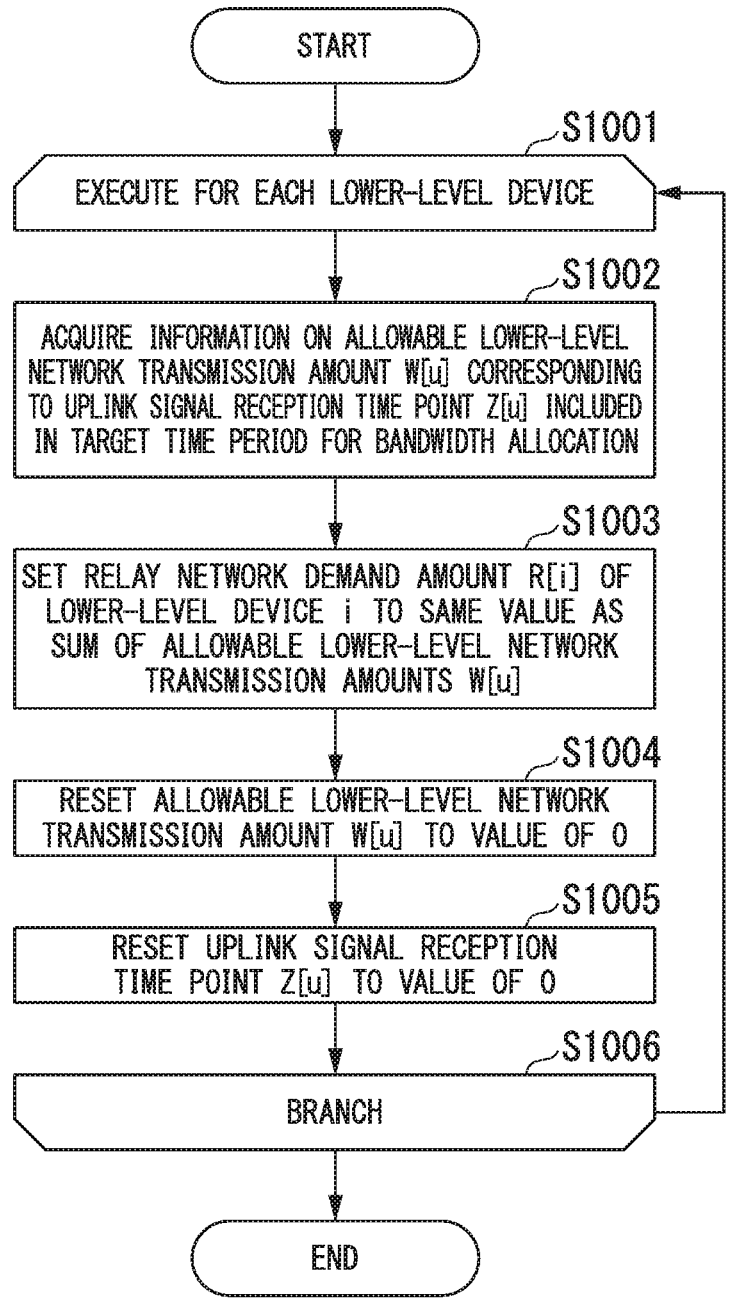
FIG. 14 is a flowchart showing an example of a procedure of calculating a relay network demand amount according to a fourth embodiment of the present invention.

FIG. 14 is a flowchart showing an example of a procedure of calculating a relay network demand amount according to the fourth embodiment.

That is, FIG. 14 is a flowchart showing the details of step S205 shown in FIG. 4. The demand amount determination unit 112 executes processes of steps S1002 to S1005 for each of the lower-level devices 14 (step S1001). Step S1002 is the same as step S702 shown in FIG. 11.

Subsequently, the demand amount determination unit 112 sets the relay network demand amount R[i] of the lower-level device 14-i to the same value as the sum of the allowable lower-level network transmission amounts W[u] of the user devices 15 accommodated in the lower-level device 14-i (step S1003). The demand amount determination unit 112 resets the allowable lower-level network transmission amount W[u] stored in the storage table to the value of 0 (step S1004). Furthermore, the demand amount determination unit 112 resets the relay network demand amount R[u] (local variable) used for a calculation process of the demand amount determination unit 112 to the value of 0 (step S1005).

As described above, the demand amount determination unit 112 according to the fourth embodiment sets the relay network demand amount R[i] of the lower-level device 14-i to the same value as the sum of the allowable lower-level network transmission amounts W[u]. In this way, according to the terminal station device 11 and the bandwidth allocation method according to the fourth embodiment, it is possible to shorten a standby period until the terminal device 13 transmits uplink communication signals on the basis of the transmission start time point S[i,n] having high accuracy even when the time interval in which the upper-level device 10 executes scheduling (bandwidth allocation) of the uplink communication of the user device 15 is shorter than the time interval in which the bandwidth allocation unit 114 of the terminal station device 11 calculates the allowable amount of relay network transmission.

The upper-level device, the terminal station device, the terminal device, the lower-level device, the user device, and the communication system according to the above-described embodiments may be implemented by a computer. In this case, a program for implementing this function may be recorded on a computer-readable recording medium, and the program recorded on the recording medium may be read and executed by a computer system to implement the function.

The "computer system" mentioned herein includes an OS and hardware such as peripheral devices. Moreover, the "computer-readable recording medium" refers to a portable medium, such as a flexible disk, an opto-magnetic disc, a ROM, or a CD-ROM, and a storage device such as a hard disk included in a computer system.

Furthermore, the "computer-readable recording medium" may include a medium for temporarily and dynamically storing programs, such as a communication cable when a program is transmitted via a network such as the Internet or a communication line such as a telephone line, and a medium for storing programs for a predetermined period, such as a volatile memory inside a computer system that serves as a server or a client in that case.

Moreover, the program may be a program for implementing some of the above-mentioned functions or a program capable of implementing the above-mentioned functions in combination with a program which is recorded on the computer system. The program may be implemented using a programmable logic device such as a FPGA (Field Programmable Gate Array).

The embodiments of the present invention have been described with reference to the drawings. However, the specific configuration is not limited to the above-described embodiment and the present invention also includes a change in design within the scope and spirit of the invention.

INDUSTRIAL APPLICABILITY

According to the terminal station device and the bandwidth allocation method of the present invention, it is possible to improve the utilization efficiency of the bandwidth of a communication system in which a lower-level device and user devices are connected in one-to-multiple correspondence.

REFERENCE SIGNS LIST

1 Communication system
10 Upper-level device
11 Terminal station device
12 Relay unit
13 Terminal device 14 Lower-level device
15 User device
20 Upper-level network
30 Relay network
40 Lower-level network
110 Upper-level communication unit
111 Information extraction unit
112 Demand amount determination unit
113 Storage unit
114 Bandwidth allocation unit
115 Lower-level communication unit
120 Optical fiber

The invention claimed is:

1. A terminal station device connected to terminal devices and an upper-level device, each of the terminal devices being connected to a respective lower-level device accommodating a plurality of user devices, the terminal station device communicating to the terminal devices by optical signals through a relay network, the terminal station device comprising:
an information extraction unit that extracts information on allocation of a bandwidth of uplink communication of each of the plurality of user devices from information notified by the upper-level device on the uplink communication of the plurality of user devices, the uplink communication being in a direction from the plurality of user devices to the upper-level device;
a storage unit that stores identification information of each lower-level device connected to a respective one of the terminal devices, identification information of the plurality of user devices, and a correlation between the identification information of each lower-level device and the identification information of the plurality of user devices;
a demand amount determination unit that calculates, on a basis of the bandwidth of the uplink communication of each of the plurality of user devices and the correlation between identification information of lower level device and the plurality of user devices, for each of the terminal devices, a sum of the bandwidth of the uplink communication of a user devices accommodated in a lower-level device connected to a relevant terminal device among the plurality of user devices, the demand amount determination unit determining each sum of the bandwidth as a bandwidth demanded amount for the uplink communication of a respective one of the terminal devices; and
a bandwidth allocation unit that calculates, on a basis of the bandwidth demanded amount for the uplink communication of each of the terminal devices, for each of the terminal devices, a start time point of the uplink communication and an amount of information of signals corresponding to the start time point so that a waiting period during which each of the terminal devices wafts for transmission of uplink communication signals is equal in all of the terminal devices, the bandwidth allocation unit allocating the start time point of the uplink communication and the amount of information of signals to a respective one of the terminal devices,
wherein the start time point of the uplink communication indicates a time at which a respective terminal device is allowed to start transmission of the uplink communication in the relay network, and
wherein the amount of information of signals indicates an amount of information allowed to be transmitted by a respective terminal device on the uplink communication in the relay network.

2. The terminal station device according to claim 1, further comprising;
a communication unit that receives the identification information of each lower-level device connected on a lower level of a respective one of the terminal devices from the respective one of the terminal devices, wherein:
the information extraction unit extracts information indicating a correspondence between the upper-level device and each lower-level device from the information notified by the upper-level device on the uplink communication of the plurality of user devices; and
the storage unit stores the identification information of each lower-level device connected to the respective one of the terminal devices, information indicating the correlation between the upper-level device and each lower-level device, and the identification information of the plurality of user devices in correlation with each other.

3. The terminal station device according to claim 1, wherein:
the information extraction unit extracts information on an amount of information of signals for which transmission of the uplink communication of the plurality of user devices is allowed from the information on the uplink communication of the plurality of user devices, and
calculates a time point at which each of the terminal devices receives uplink communication signals from the plurality of user devices on a basis of a time point at which the information extraction unit receives the information on the uplink communication from the upper-level device and a period required for signals to be transmitted between the terminal station device and the terminal devices; and
the demand amount determination unit determines the bandwidth demanded amount for the uplink communication each of the terminal devices on a basis of the amount of information of the signals for which transmission of the uplink communication of the plurality of user devices is allowed and the time point at which each of the terminal devices receives the uplink communication signals from the plurality of user devices.

4. The terminal station device according to claim 1, wherein the demand amount determination unit, for each of the terminal devices, the sum of the bandwidth of the uplink communication of a user device accommodated in a relevant terminal device among the plurality of user device, the user device transmitting uplink communication signals to the relevant terminal device in a specific time period.

5. The terminal station device according to claim 1, wherein the bandwidth allocation unit subdivides the bandwidth demanded amount for the uplink communication of each of the terminal devices and allocates for each subdivided bandwidth, the start time point of the uplink communication and the amount of information of signals to a respective one of the terminal devices.

6. A bandwidth allocation method performed by a terminal station device connected to a plurality of terminal devices, each of the terminal devices being connected to a respective lower-level device accommodating a plurality of user devices, the terminal station device communicating to the terminal devices by optical signals through a relay network, the bandwidth allocation method comprising:

extracting information on allocation of a bandwidth of uplink communication of each of the plurality of user devices from information notified by the upper-level device on the uplink communication of the plurality of user devices, the uplink communication being in a direction from the plurality of user devices to the upper-level device;

calculating, for each of the terminal devices, a sum of the bandwidth of the uplink communication of a user device accommodated in a lower-level device connected to a relevant terminal device among the plurality of user devices on a basis of the information on the allocation of the bandwidth of the uplink communication of each of the plurality of user devices, identification information of each lower-level device connected to a respective one of the terminal devices and identification information of the plurality of user devices, the identification information of each lower-level device and the identification information of the plurality of user devices being stored in correlation with each other;

determining each sum of the bandwidth as a bandwidth demanded amount for the uplink communication of a respective one of the terminal devices;

calculating on a basis of the bandwidth demanded amount for the uplink communication of each of the terminal devices, for each of the terminal devices, a start time point of the uplink communication and an amount of information of signals, corresponding to the start time point, so that a waiting period during which each of the terminal devices waits for transmission of uplink communication signal is equal in all of the terminal devices;

allocating the start time point of the uplink communication and the amount of information of signals, corresponding to the start time point, to a respective one of the terminal devices, wherein the start time point of the uplink communication indicated a time allowed to start transmission of the uplink communication in the relay network from a respective terminal device; and wherein the amount of information of signal indicates an amount of information allowed to be transmitted on the uplink communication in the relay network from a respective terminal device.

* * * * *